(12) United States Patent
Azarian-Yazdi et al.

(10) Patent No.: US 8,380,182 B2
(45) Date of Patent: Feb. 19, 2013

(54) METHOD AND APPARATUS FOR IMBALANCE COMPENSATION IN WIRELESS NETWORKS

(75) Inventors: Kambiz Azarian-Yazdi, San Diego, CA (US); Christopher Gerard Lott, San Diego, CA (US); Rashid Ahmed Akbar Attar, San Diego, CA (US); Donna Ghosh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 12/605,213

(22) Filed: Oct. 23, 2009

(65) Prior Publication Data

US 2010/0105422 A1    Apr. 29, 2010

Related U.S. Application Data

(60) Provisional application No. 61/108,323, filed on Oct. 24, 2008.

(51) Int. Cl.
*H04W 4/00* (2009.01)

(52) U.S. Cl. .................................... 455/422.1; 455/522

(58) Field of Classification Search .................. 455/69, 455/522, 436, 439, 441
See application file for complete search history.

(56) References Cited

U.S. PATENT DOCUMENTS

| | | | |
|---|---|---|---|
| 6,850,771 B2* | 2/2005 | Malladi et al. | 455/522 |
| 6,931,257 B2 | 8/2005 | Shahidi et al. | |
| 2004/0142692 A1* | 7/2004 | Schwarz et al. | 455/442 |
| 2007/0049318 A1 | 3/2007 | Qi et al. | |
| 2007/0077956 A1* | 4/2007 | Julian et al. | 455/522 |

FOREIGN PATENT DOCUMENTS

| | | |
|---|---|---|
| GB | 2358109 | 3/2004 |
| WO | WO03034612 | 4/2003 |

OTHER PUBLICATIONS

International Search Report &Written Report—PCT/US09/061979, International Search Authority—European Patent Office—Feb. 4, 2010.

* cited by examiner

*Primary Examiner* — Tu X Nguyen
(74) *Attorney, Agent, or Firm* — Jeffrey D. Jacobs

(57) ABSTRACT

An apparatus including a processing system configured to determine an imbalance indicator from each sector in an active set; and boost overhead power based on the imbalance indicator from each of the sectors. A method for performing the process is also disclosed herein.

40 Claims, 6 Drawing Sheets

602 — MODULE FOR DETERMINING AN IMBALANCE INDICATOR FROM EACH SECTOR IN AN ACTIVE SET

604 — MODULE FOR BOOSTING AT OVERHEAD POWER BASED ON THE IMBALANCE INDICATOR FROM EACH OF THE SECTORS

METHOD AND APPARATUS FOR IMBALANCE COMPENSATION IN WIRELESS NETWORKS

CROSS-REFERENCE TO RELATED APPLICATIONS

Claim of Priority Under 35 U.S.C. §119

The present application for patent claims priority to Provisional Application No. 61/108,323, entitled "FL\RL Imbalance Compensation Methods in the Presence of Large Forward Link Transmission Power Differentials" filed Oct. 24, 2008, and assigned to the assignee hereof and hereby expressly incorporated by reference herein.

BACKGROUND

I. Field

The following description relates generally to communication systems, and more particularly to a method and apparatus for imbalance compensation in wireless networks.

II. Background

In a communication network, a mobile device communicates with other mobile devices through various base transceiver stations (BTSs). A BTS is an equipment that receives data from one mobile device and transmits it to another mobile device, thereby facilitating the communication between them. Mobile devices are also referred to as access terminals (ATs). Each BTS serves a pre-defined geographical area, which is divided into smaller areas called sectors. Therefore, each sector covers a geographic area. The AT can select a suitable sector within its geographic vicinity and establish a communication link with the BTS of the selected sector. The link then facilitates the communication between the AT and other ATs. A base station controller (BSC) controls and monitors various BTSs and ATs and helps in the selection of a suitable sector.

The process of selecting a sector by the AT depends on the signal strength the sector provides to the AT. The data rate control (DRC) value of the sector is a measure f the strength of the forward link (FL). The strength of the FL relates to the data rate that can be supported by the current radio frequency (RF) conditions of the communication link between the AT and the BTS of the sector. The AT typically selects the sector that has the highest DRC value. The selected sector then transmits the data on the FL.

In the Evolution-Data Optimized (EV-DO or, simply, DO) family of protocols, there is no single reverse link (RL) serving sector. Instead, every BTS in an AT's active-set participates in the decoding process. This is known as RL soft handoff. To maintain the decoding performance at a desired level, each BTS instructs the AT, through a one-bit command known as the reverse power control (RPC), to either increase or decrease its pilot power by an offset. Since the AT needs to be decoded by no more than one BTS, it only increases its pilot power if all RPC commands it receives instruct it to do so. This approach allows for minimizing both the AT's transmission power and the interference it causes. To control the load, which is the total received power, a BTS broadcasts an indicator known as a reverse activity bit (QRAB) whenever its received power exceeds a preset threshold. The AT's receiving the QRAB react by reducing the gain of their RL traffic channel relative to the pilot channel. This reduces the AT's contribution to the BTS's load. However, it also forces the AT to lower its RL transmission rate to maintain the decoding performance at the BTS.

Once an AT is powered on, it continuously searches for new BTS's and adds them to the AT's active-set, provided that the received $E_{cp}/I_0$ exceeds a threshold called $T_{add}$. $E_{cp}/I_0$ is the difference between the signal strength and the noise floor and a measure of the portion of the RF signal which is usable. On the other hand, the AT drops a BTS from its active-set, once its received $E_{cp}/I_0$ falls below another threshold called $T_{drop}$. Usually, $T_{drop}$ is a few dB smaller than $T_{add}$ to provide some hysteresis; however, in this disclosure it is assumed that the two thresholds have the same value for simplicity (basic results of the disclosure follow in either case). An AT normally picks the pilot in its active-set with the largest $E_{cp}/I_0$ as its FL serving sector. However, if this BTS resets the DRC lock bit corresponding to the AT, then the AT will proceed to use the pilot from the BTS having the next largest $E_{cp}/I_0$. A BTS may reset the DRC lock bit of an AT if, for example, the BTS is performing poorly in decoding the AT's OH channels.

When there is heterogeneity in DO networks, where heterogeneity refers to the different BTS capabilities, such as transmission power, imbalance can occur. For example, f-Imbalance and OH-Imbalance are two types of imbalances that may be caused by heterogeneity. For example, OH-Imbalance, which is also referred to as Pilot\DRC\ACK imbalance, occurs when an AT is served on the FL by a farther-away high power sector, while the AT is power controlled on the RL by a nearby low power sector. The pilot and\or overhead (e.g., DRC or ACK) channels, which are transmitted on the RL and are essential for proper operation of the FL, may be too weak to be received at the high power sector. Also, as another example, f-Imbalance occurs when an AT is closer to a cell that is not power-controlling the AT.

Consequently, it would be desirable to address one or more of the imbalances or other deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communications, where an apparatus for wireless communications includes a processing system configured to determine an imbalance indicator from each sector in an active set; and boost AT overhead power based on the imbalance indicator from each of the sectors.

In another aspect, an apparatus for wireless communications is provided that includes means for determining an imbalance indicator from each sector in an active set; and means for boosting AT overhead power based on the imbalance indicator from each of the sectors.

In yet another aspect, a method for wireless communications is provided that includes determining an imbalance indicator from each sector in an active set; and boosting overhead power based on the imbalance indicator from each of the sectors.

In yet another aspect, a computer-program product for communication is provided that includes a machine-readable medium encoded with instructions executable to determine an imbalance indicator from each sector in an active set; and boost AT overhead power based on the imbalance indicator from each of the sectors.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Figure 1:
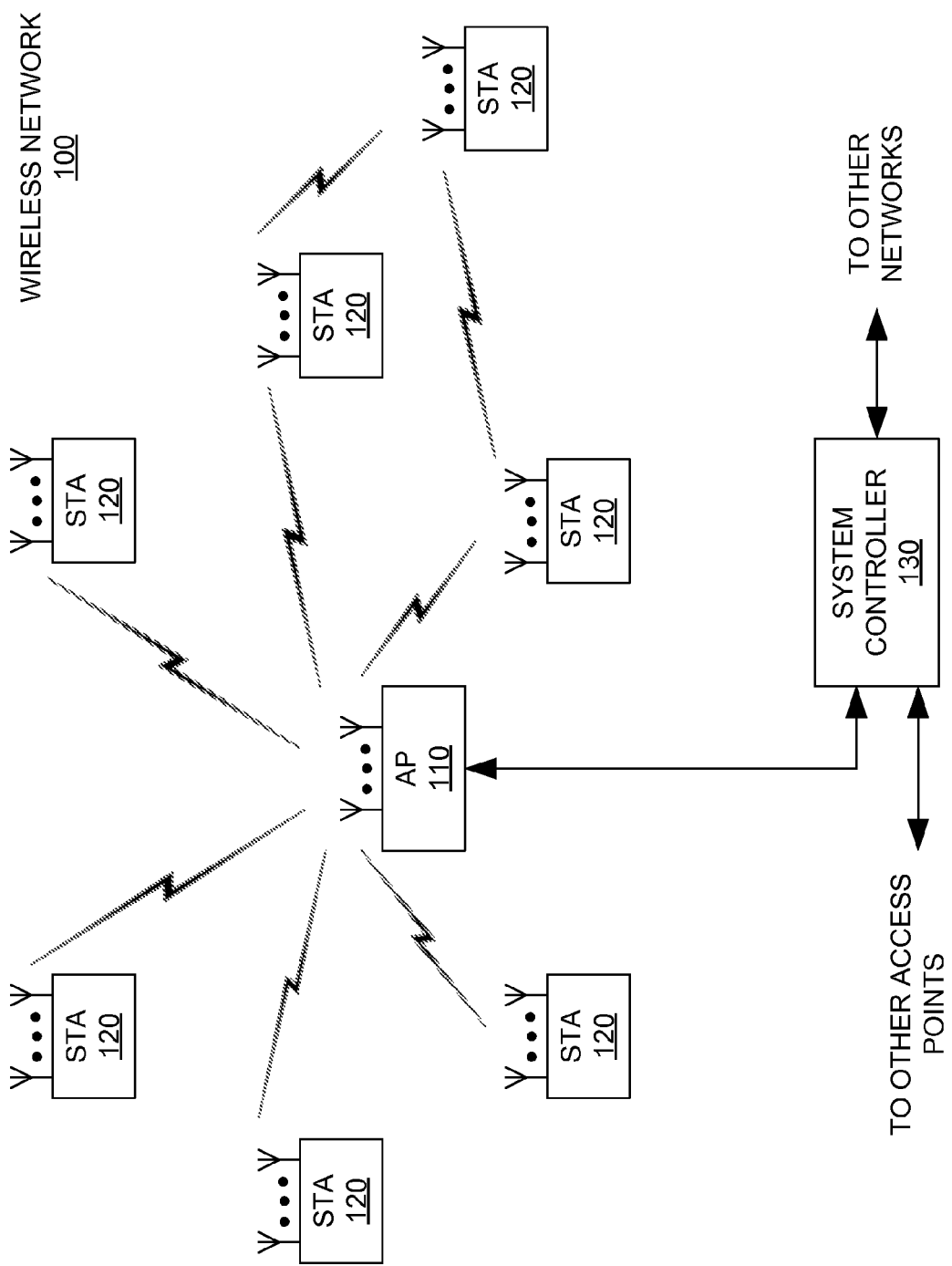
FIG. 1 is a diagram of a wireless communications network configured in accordance with an aspect of the disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The system described herein attempts to compensate for imbalance conditions caused by heterogeneity in DO networks. As examples, two types of imbalance, f-Imbalance and OH-Imbalance are addressed, as further described herein, using such methods as RL padding, AT overhead (OH) channel boost, and traffic channel suppression. Specifically, through a combination of methods such as partial RL padding of weaker cells, OH channel boost and traffic channel suppression of AT's, it is possible to compensate for the potentially severe imbalance conditions that heterogeneity brings about to DO networks.

Figure 2:
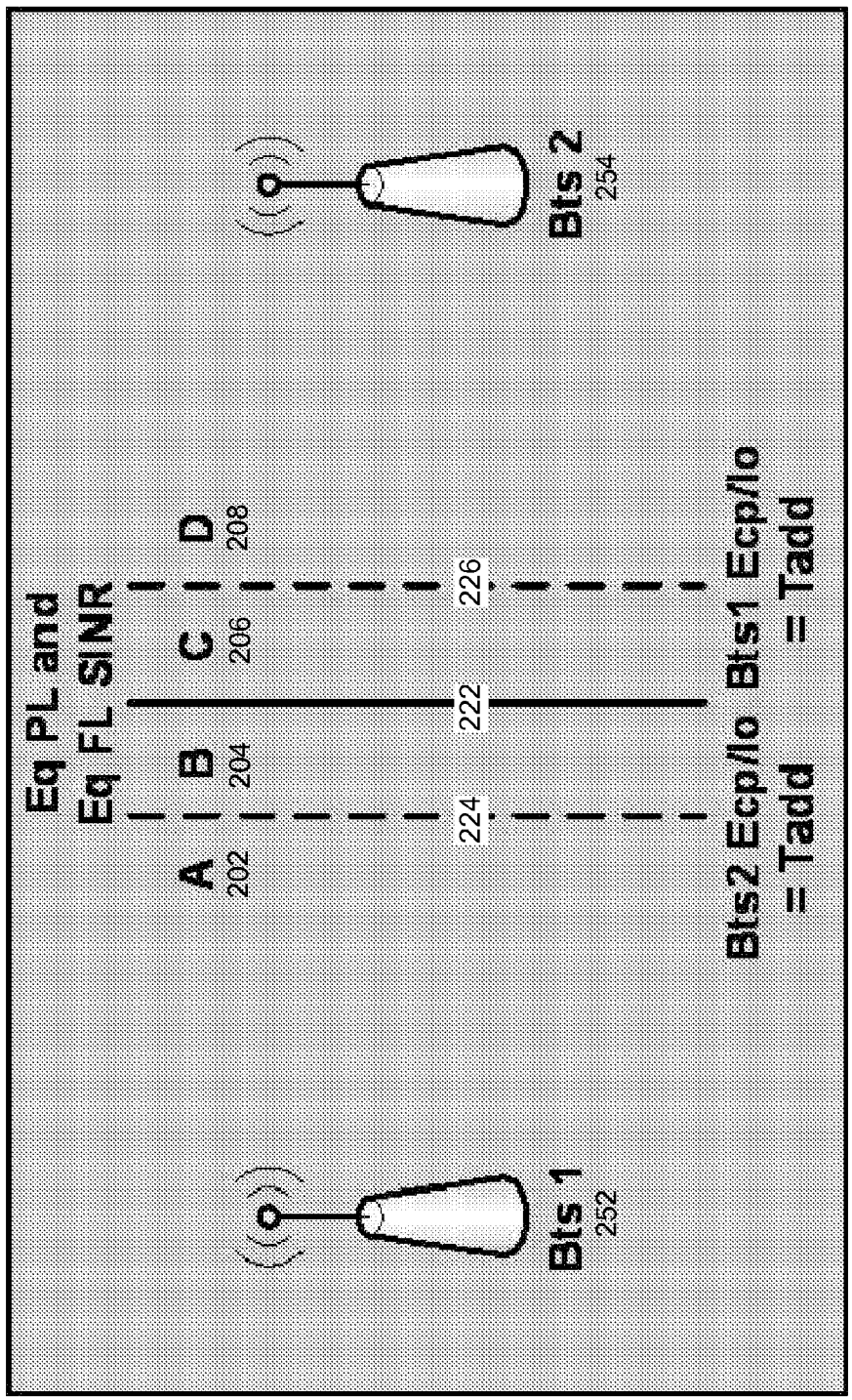
FIG. 2 is a block diagram of two BTSs, each serving a sector, configured in a homogeneous scenario.

In order to understand the imbalance conditions caused by heterogeneity in DO networks, it is beneficial to start with understanding a homogeneous scenario. FIG. 2 illustrates a homogenous network 200 of two identical BTS, a BTS 1 252 and a BTS 2 254, that are controlled by the same BSC (not shown) and hence make RL soft handoff available, along with an equal path loss (PL) and equal FL signal to interference-plus-noise ratio (SINR) boundary 222. Also shown are boundaries 224, 226 beyond which the BTS's $E_{cp}/I_0$ exceeds (or drops below) $T_{add}$. For example, a region B 204 is where the $E_{cp}/I_0$ of the BTS 2 254 exceeds $T_{add}$, while a region A 202 is where the $E_{cp}/I_0$ of the BTS 2 254 drops below $T_{add}$. Similarly, a region C 206 is where the $E_{cp}/I_0$ of the BTS 1 252 exceeds $T_{add}$, while a region D 208 is where the $E_{cp}/I_0$ of the BTS 1 252 drops below $T_{add}$. The main characteristic to be noticed in this figure is that, as a result of symmetry, the equal PL and equal FL SINR boundaries of both the BTS 1 252 and the BTS 2 254, illustrated by the boundary 222, fall on top of one another. As a consequence, an AT always sees a smaller PL to its FL serving sector than to the other BTS. For example, the regions A 202 and B 204 are served on the FL by the BTS 1 252 and have a smaller PL to it than to BTS 2 254.

Figure 3:
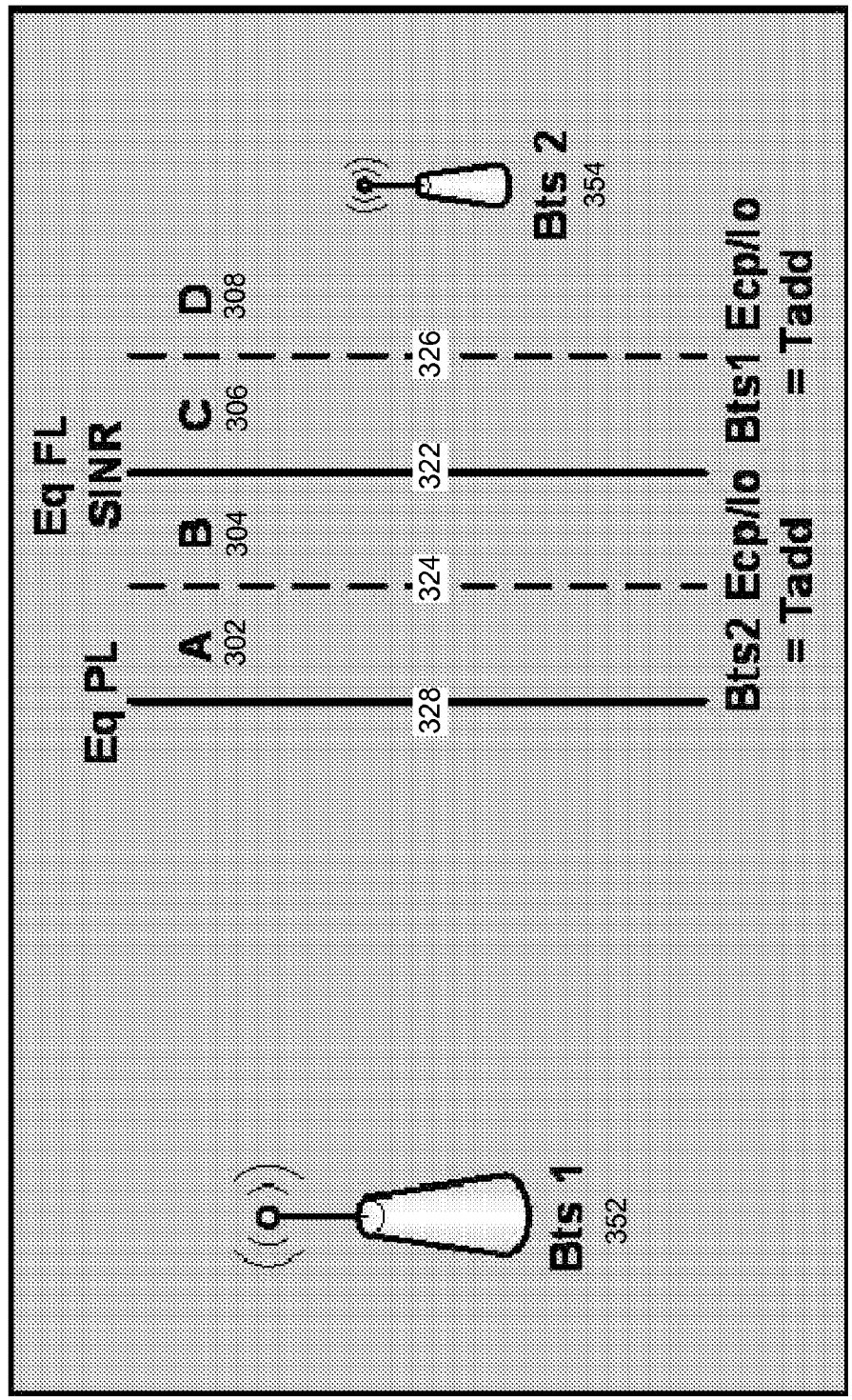
FIG. 3 is a block diagram of two BTSs, each serving a sector, configured in a heterogeneous scenario where there is a large transmission power differential between the two.

FIG. 3 illustrates a heterogeneous network 300 of two BTS, a BTS 1 352 and a BTS 2 354, the heterogeneity stems from the BTS 2 354 having a smaller transmission power than the BTS 1 352. This could be the case, for example, when the BTS 1 352 represents a Macro base station while the BTS 2 354 denotes a Pico base station, a relay, or for that matter any other kind of BTS with a smaller transmission power. The difference in transmission powers could be as large as 12 dB or more. The main point here is not the types of base stations that the BTS 1 352 and the BTS 2 354 represent—although, for simplicity, from now on it is assumed that the BTS 1 352 is a Macro base station and the BTS 2 354 is a Pico base station, but that the equal PL and equal FL SINR boundaries, where an AT experiences an equal amount of PL and an equal amount of FL SINR, respectively, no longer coincide. Instead, they are illustrated as an Eq PL boundary 328 and an equal FL SINR boundary 322 in the figure. This mismatch causes two types of imbalances: f-Imbalance and OH-Imbalance. It should be noted that a boundary 324 where $E_{cp}/I_0$ from the BTS 2 354 equals $T_{add}$ is shown to be to the right of the Eq PL boundary 328. A boundary 326 where $E_{cp}/I_0$ from the BTS 1 352 equals $T_{add}$. This may not necessarily be the case, and depends on a transmission power differential between the two BTS's. The figure illustrates a scenario where there is a sufficiently large power differential between the BTS 1 352 and the BTS 2 354. As described herein, large differential in FL transmission power of neighboring sectors may cause imbalance.

For f-Imbalance, consider an AT located in the coverage area labeled region A 302 in FIG. 3. Such an AT, despite having a smaller PL to the BTS 2 354, will only be power controlled by the BTS 1 352. This is because the BTS 2 354, as a result of having a smaller transmission power, does not make it to the AT's active-set. Consequently, the AT makes more interference to the BTS 2 354 than it contributes signal to BTS 1 352, which serves it on the RL. This condition may lead to severe inter-cell interference, manifested in a large f value, at the BTS 2 354, and thus is called f-Imbalance. In a nutshell, f-Imbalance arises whenever an AT, despite being close (from a RL PL or RL $E_{cp}/N_t$ point of view) to a sector, is not power controlled by it. It is noteworthy that AT's located in the region A 302 are RL power controlled by the same sector; that is, the BTS 1 352, that serves them on the FL. As a result, such AT's OH channels are decoded properly and at the desirable error rate. The f-imbalance may occur when an AT, despite being physically closer to a low power sector, is not power controlled by it, but is instead power-controlled by a high power sector from which it is further apart. The AT will cause high levels of reverse link (RL) interference to the low power sector, which is the BTS 2 354.

To understand OH-Imbalance, consider an AT located in the coverage area labeled as a region B 304. Such an AT, despite having the BTS 1 352 as its FL serving sector, is effectively power controlled by the BTS 2 354. This is because although the AT has both BTS's in its active-set, it has a smaller PL to the BTS 2 354. Consequently, the BTS 1 352, which is the FL serving sector, may not be able to decode the AT's overhead channels at the desirable error rate. Since reliable decoding of overhead channels is essential for proper operation of the FL, the BTS 1 352 may force the AT to change its FL serving sector, such as by resetting its DRC lock bit. This degrades the quality of communication over the FL, as the AT now has to pick the BTS 2 354, which has a smaller $E_{cp}/I_0$, as its FL serving sector. In a nutshell, OH-Imbalance arises whenever an AT is served on the FL by a sector, but effectively power controlled on the RL by other cells. It is worth noting that since the AT's located in the coverage area as the region B 304 are RL power controlled by both sectors, they do not cause excessive inter-cell interference.

While power-heterogeneity is a major source of imbalance in DO networks, other types of asymmetry such as channel-mismatch between FL and RL, or uneven RL load distribution among sectors, may cause imbalance conditions, even in homogeneous deployments. To further understand this point, notice that in frequency division duplex (FDD) deployments, FL and RL channels occupy distinct frequency bands, and as such, may have different channel gains, at least momentarily. As a result, the equal PL and equal FL SINR boundaries may not coincide, even in the homogeneous deployment depicted in FIG. 2. On the other hand, it is important to realize that when referring to, for example, an AT's interference or OH decoding at a BTS, the AT's RL $E_{cp}/N_t$ or RL SINR (not to be confused with a pilot's FL $E_{cp}/I_0$), is the relevant quantity, and not the AT's RL PL. In other words, both the AT's RL PL, and the BTS's RL load have to be considered. For example, an AT located in coverage area labeled the region B 204 in FIG. 2 could suffer from OH-Imbalance at the BTS 1 252, despite the fact that the AT encountered a larger RL PL to the BTS 2 254 than to the BTS 1 252. Likewise, an AT located in coverage area labeled as the region A 202 in FIG. 2, could cause severe interference at the BTS 2 254 (f-Imbalance), had the BTS 2 254 experienced a much smaller load than the BTS 1 252.

In order to address the imbalances, padding the RL of the low power sectors in an amount equal to the transmission power differential may make the equal RL Path Loss border overlay the equal $E_{cp}/N_t$ line, and hence remove the imbalance. This approach may work well when the power differential is relatively small, such as by a few dBs. However, severe instability and\or inefficiency issues may be caused when the power differential is relatively large. Thus, there was no reliable approach to compensate for large imbalances.

The disclosed system proposes several approaches to addressing imbalance. In one aspect of the disclosure, the system boosts AT overhead channels in the RL to increase relative gain of overhead channels. The RL includes a pilot channel, traffic channels, and overhead channels. Specifically, the power of the overhead channels is boosted relative to the pilot channel. The boosting may be adaptive or static. For example, the AT performs the boosting based on the active set size and relative FL quality. The AT may also boost based on condition that: 1) the power-controlling cell is different from the serving cell; and also 2) when DRCLock is not set for best FL. The amount of boost can be defined by the access network (AN).

In another aspect of the disclosure, the system pads the RL of the low power sector, which may be in an adaptive or fixed manner. Specifically, the padding is an intentional attenuation of a received signal at the low power sector. The padding may be performed physically or in software and can be anything that degrades the received signal. Further, the power control would be relative to the padding, and thus would be able to alleviate both types of imbalances. The AN controls the extent of padding.

Padding the RL of low power sectors that suffer from a large f causes the following chain of events:

1. As a result of padding, the interference caused by ATs not power controlled by the suffering sector is reduced.

2. To maintain the sector's RoT at the desired level, the ATs power controlled by the sector are instructed to increase their transmission power.

3. The net effect is a reduction in sector's f-Imbalance.

Adaptive adjustment of low-power sector's RoT threshold has the same effect on f-Imbalance as RL padding, plus the advantage that it provides better throughputs, as no Rx power is wasted on the pads. To prevent any instability and\or inefficiency issues, the pads and the RoT threshold adjustments are limited to small values and are applied only when necessary.

It should be noted that to compensate for large FL transmission power differentials (e.g., several dB), it may be necessary to use all or a subset of the aforementioned methods. These methods can also be used for load balancing. Preferably, the best overall method is to use a small amount of padding, and augmented with OH channel boost. Further, the amount of compensation for adaptive methods can be based on the AT's current active set. For example, no compensation may be used if there is only one entry in the AT's current active set.

The following proposes some approaches for compensating imbalance conditions in heterogeneous DO networks. Realizing that the mismatch between the equal PL and equal FL SINR boundaries is the main symptom of imbalance in heterogeneous DO networks, in one aspect of the disclosure, imbalance compensation is attempted through a technique referred to herein as RL padding. RL padding refers to any method where the signal received at the BTS is attenuated before being used for such purposes as power control or packet decoding. This includes methods such as applying physical pads to the BTS's receive antennas, or attenuating the signal in firmware through such operations as power-of-2 division. In some aspects of the disclosure, certain padding techniques may be applied based on the particular implementation. For example, physical pads may be necessary when there is danger of BTS receiver saturation, in which case padding must take effect before A/D conversion. For typical receiver architectures, and transmission power differentials as considered herein, saturation is typically not a danger. Thus, the padding may be implemented in a DSP or software.

Regardless of the approach implemented for attenuation, the net effect of RL padding is that all AT's experience may increase by the amount of padding in their RL PL to the padded BTS. In various aspects of the disclosure, the RL padding does not affect the FL in any way and it may be possible to totally remove a mismatch between the equal PL and equal FL SINR boundaries, such as that illustrated in FIG. 3, by applying RL padding in an amount equal to the transmission power differential to the BTS 2 354.

Figure 4:
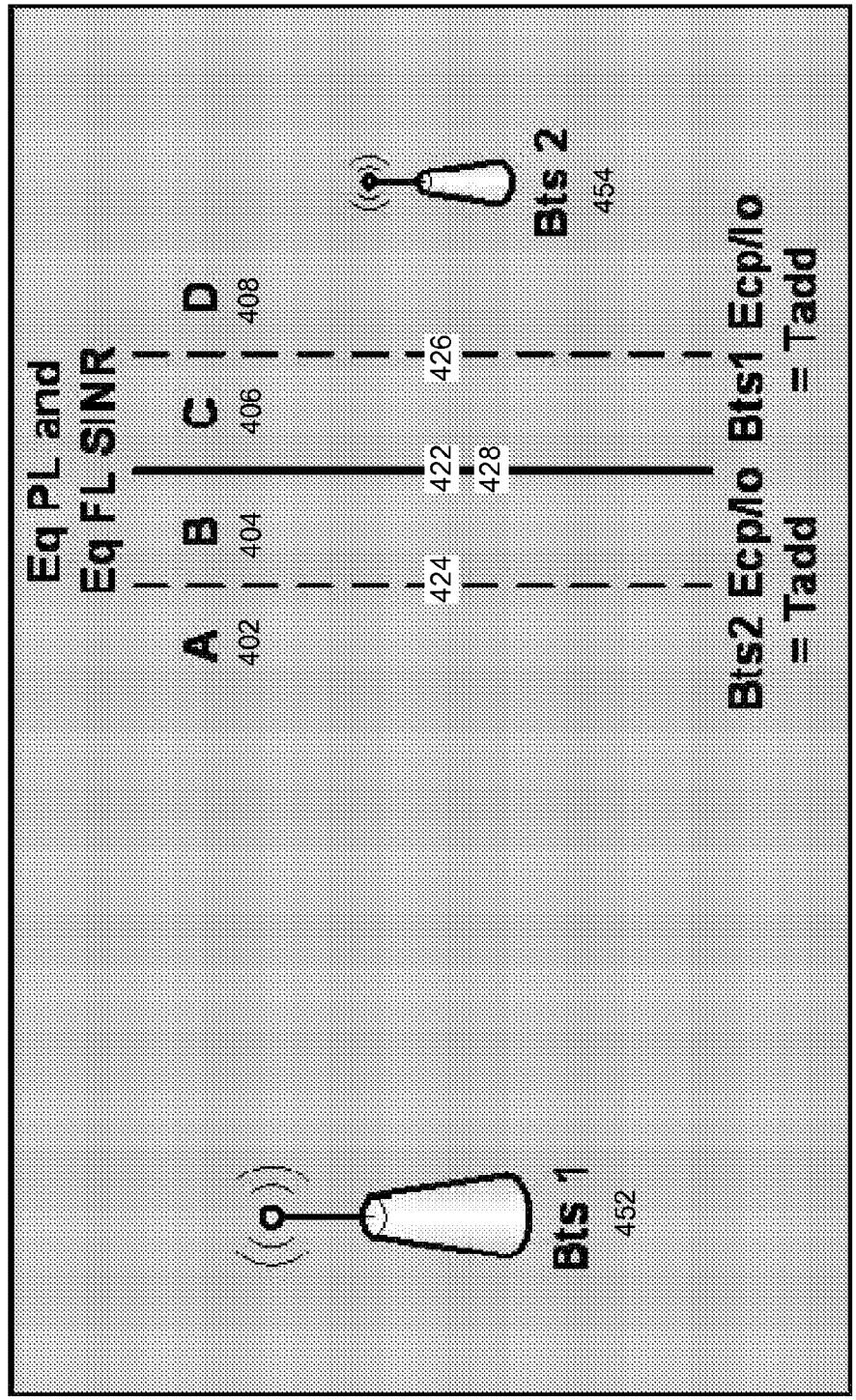
FIG. 4 is a block diagram of two BTSs, each serving a sector, with a differential between the two sectors.

FIG. 4 illustrates the various regions of coverage in a heterogeneous setting 400 after an RL padding, equal to the FL power differential as determined is applied to a BTS 2 454 that is weaker than a BTS 1 452. Although imbalance compensation through RL padding works well in situations where there is only a few dB of power differential, applying larger amounts of padding, such as those needed when the BTS 1 452 and the BTS 2 454 respectively represent a Macro base station and a Pico base station, with a potential power differential of 12 dB or more, could be quite problematic.

One problem is the inefficiency in AT transmission power use that results from attenuating the received signal. The second problem, which may be much more severe, has to do with the f-Imbalance that is a combination of two factors where heavy padding of the BTS 2 454 (the weaker sector), and its smaller coverage area, impose on the BTS 1 452 (the stronger sector). To understand this phenomenon, consider an AT served on the RL by the BTS 2 454, located in coverage areas labeled as a region C 406 and a region D 408 in FIG. 4. Although such an AT sees a smaller RL PL to the BTS 2 454 than to the BTS 1 452, the two values may be comparable, such as within a few dB of one another. This is especially the case for those AT's located in the region C 406 or close to the dotted line in the region D 408. Since the signal from such AT's is heavily attenuated at the BTS 2 454, they have to boost their pilot channel (and along with it, their traffic channel), just to get through the padding. On the other hand, since the BTS 2 454, despite having a smaller coverage area (it may be helpful to visualize the coverage areas of the region C 406 and the region D 408 as concentric disks centered at the BTS 2 454), controls its load to the same target value as the BTS 1 452, the ATs served by it on the RL will further boost their traffic channel (to fill its rise). Now given that such ATs have relatively good channel gains to the BTS 1 452, are transmitting at high transmission power levels and may not be power controlled by the BTS 1 452 (at least those located in the region D 408), they may cause excessive inter-cell interference at the BTS 1 452, and even overwhelm it, if the load control mechanism fails. Thus, while applying no padding results in f-Imbalance at weaker sectors, too much padding has the reverse effect of causing f-Imbalance at the stronger ones. It will be shown further herein that there is a sweet-spot in between where partial padding, padding weaker sectors such as Pico cells, by only a few dB, may be used as an efficient way for reducing f-Imbalance and OH-Imbalance.

OH-Imbalance occurs whenever an AT is effectively power controlled by a BTS other than that containing its FL serving sector. As a result, the FL serving sector may not receive the energy needed for reliably decoding of the OH channels that are essential for proper operation of the FL. Consequently, any approaches that, directly or indirectly, results in a boost in the ATs OH channels will help reduce this type of imbalance. In one aspect of the disclosure, an ATs OH channels will be boosted by increasing the OH channels' gain relative to the pilot channel. This guarantees that the FL serving sector receives enough energy from the OH channels, even in situations where the AT's pilot is suppressed by another power controlling BTS. In another aspect of the disclosure, the OH channels is boosted through suppression of AT's traffic channel such that the AT's traffic channel gain is reduced relative to its pilot channel. To understand how this method works, one needs to realize that reducing the traffic channel's gain causes the reverse link setpoint, which is maintained by the power control outer loop (at the dominant power controlling BTS), to increase. This increase in setpoint causes a boost in the pilot channel, and along with it, the OH channels since the OH channel gains are pre-determined with respect to the pilot channel. As mentioned, this approach has the added advantage that it causes a boost in the pilot channel as well, which is essential for decoding of OH channels, although in most cases this may not be needed since in the DO, the pilot power is generally much greater than what is needed for decoding of OH channels. The pilot power is designed for efficient decoding of traffic channel, which operates at higher rates.

In other aspects of the disclosure, other approaches may be used to compensate for f-imbalance and/or OH-Imbalance. For example lowering $T_{add}$, may reduce f-Imbalance at the weaker sectors by improving the chance that the AT adds them to its active-set, and thus is power controlled by them. On the other hand, setting the minimum allowable setpoint of an AT to a higher value helps compensating for OH-Imbalance. Also, it will be illustrated that increasing the load level of a sector to a higher value has the same effect as RL padding, as far as imbalance is concerned. In fact, this approach has the added advantage that, rather than wasting some portion of the received power at the pad, it makes the whole received power available for decoding. However, these approaches have their own drawbacks.

To compensate for large transmission power differentials, larger than 3 dB, in an aspect of the disclosure it may be necessary to use all or a subset of the aforementioned approaches. Also, the proposed approaches could be made adaptive such that the amount of compensation they provide is based on a particular situation of the BTS, such that, for example, in case of RL padding, or the AT, such that, for example, in case of OH channel boost or traffic channel suppression.

As discussed above, it is possible to address two types of imbalance: f-Imbalance and OH-Imbalance through a combination of approaches such as partial RL padding of Picocells and OH channel boot and traffic channel suppression of ATs. Thus, it is possible to compensate for the sever imbalance issues that heterogeneity causes in DO networks.

Figure 5:
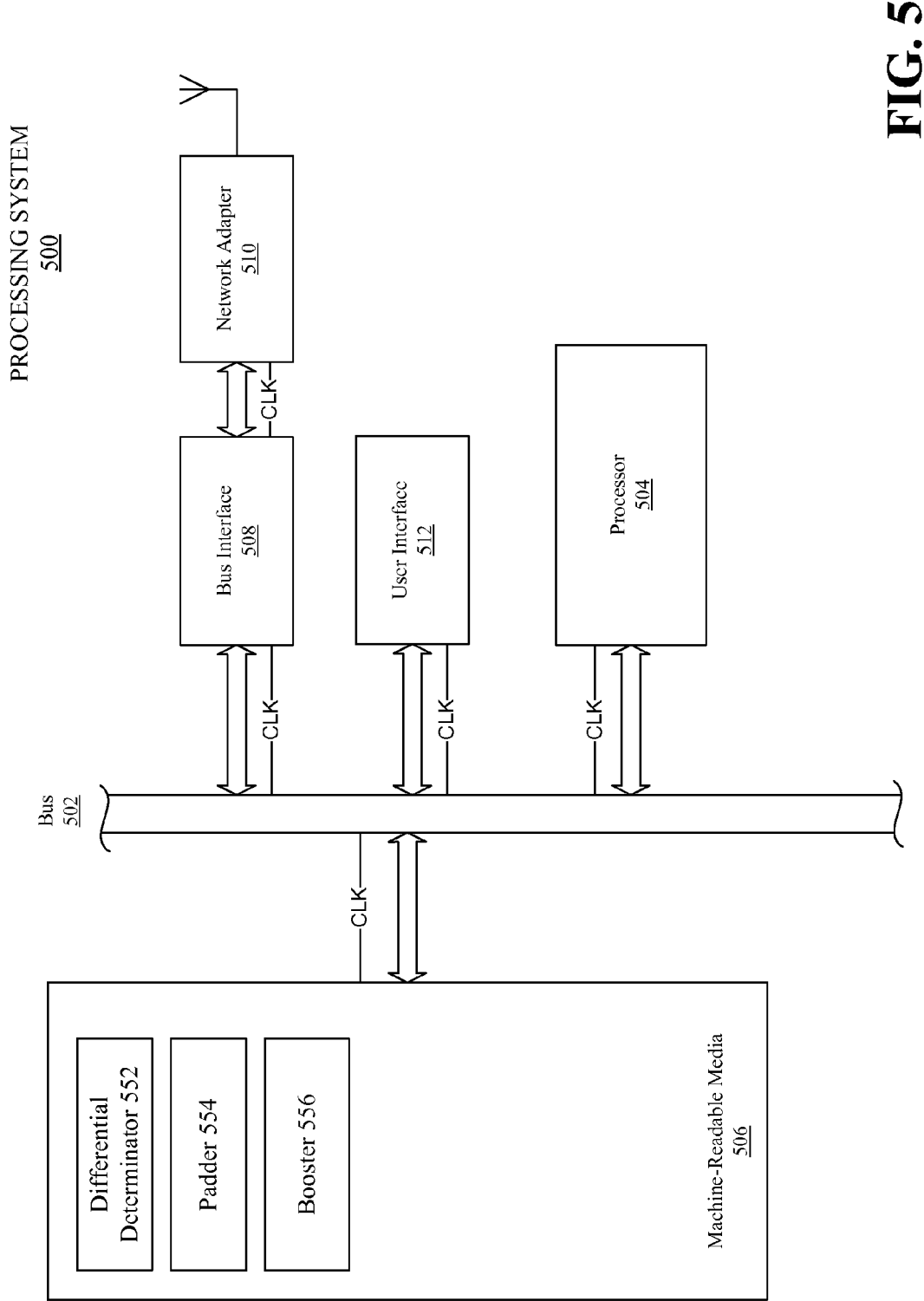
FIG. 5 is a block diagram illustrating an example of a hardware configuration for a processing system in a wireless node in the wireless communications network of FIG. 1; and, FIG. 6 is a block diagram illustrating the functionality of an apparatus for imbalance compensation in accordance with one aspect of the disclosure.

FIG. 5 is a conceptual diagram illustrating an example of a hardware configuration for a processing system in a wireless node. In this example, the processing system 500 may be implemented with a bus architecture represented generally by bus 502. The bus 502 may include any number of interconnecting buses and bridges depending on the specific application of the processing system 500 and the overall design constraints. The bus links together various circuits including a processor 504, machine-readable media 506, and a bus interface 508. The bus interface 508 may be used to connect a network adapter 510, among other things, to the processing system 500 via the bus 502. The network interface 510 may be used to implement the signal processing functions of the PHY layer. In the case of an access terminal 110 (see FIG. 1), a user interface 512 (e.g., keypad, display, mouse, joystick, etc.) may also be connected to the bus. The bus 502 includes a clock line (CLK) to communicate a clock. The bus 502 may also link various other circuits such as timing sources, peripherals, voltage regulators, power management circuits, and the like, which are well known in the art, and therefore, will not be described any further.

The processor 504 is responsible for managing the bus and general processing, including the execution of software stored on the machine-readable media 508. The processor 508 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 5, the machine-readable media 506 is shown as part of the processing system 500 separate from the processor 504. However, as those skilled in the art will readily appreciate, the machine-readable media 506, or any portion thereof, may be external to the processing system 500. By way of example, the machine-readable media 506 may include a transmission line, a carrier wave modulated by data, and/or a computer product separate from the wireless node, all which may be accessed by the processor 504 through the bus interface 508. Alternatively, or in addition to, the machine readable media 504, or any portion thereof, may be integrated into the processor 504, such as the case may be with cache and/or general register files. The machine-readable media 506 includes a plurality of modules that includes a differential determiner 552, which determines the operational characteristic differences, and an array generator 554, which generates a padding as desired by the system. A booster 556 may determine a boost to overhead power for an AT.

The processing system 500 may be configured as a general-purpose processing system with one or more microprocessors providing the processor functionality and external memory providing at least a portion of the machine-readable media 506, all linked together with other supporting circuitry through an external bus architecture. Alternatively, the processing system 500 may be implemented with an ASIC (Application Specific Integrated Circuit) with the processor 504, the bus interface 508, the user interface 512 in the case of an access terminal), supporting circuitry (not shown), and at least a portion of the machine-readable media 506 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 500 depending on the particular application and the overall design constraints imposed on the overall system.

The machine-readable media 506 is shown with a number of software modules. The software modules include instructions that when executed by the processor 504 cause the processing system 500 to perform various functions. Each software module may reside in a single storage device or distributed across multiple storage devices. By way of example, a software module may be loaded into RAM from a hard drive when a triggering event occurs. During execution of the software module, the processor 504 may load some of the instructions into cache to increase access speed. One or more cache lines may then be loaded into a general register file for execution by the processor 504. When referring to the functionality of a software module below, it will be understood that such functionality is implemented by the processor 504 when executing instructions from that software module.

FIG. 6 is a diagram illustrating the functionality of an apparatus 600 in accordance with one aspect of the disclosure. The apparatus 600 includes a module 602 for determining an imbalance indicator from each sector in an active set; and a module 604 for boosting AT overhead power based on the imbalance indicator from each of the sectors.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A compensation method in wireless communications comprising:
   determining an imbalance indicator from each sector in an active set;
   boosting overhead power based on the imbalance indicator from each of the sectors; and
   padding, at least partially, a base transceiver station corresponding to a reverse link of a lower power sector to thereby attenuate signals received at the base transceiver station.

2. The method of claim 1, wherein the imbalance indicator comprises an overhead imbalance indicator.

3. The method of claim 1, wherein the imbalance indicator comprises a transmit power/padding difference.

4. The method of claim 3, wherein the transmit power/padding difference indicates an amount of imbalance and wherein the boosting is based on the transmit power/padding difference.

5. The method of claim 4, wherein the boosting is only partially based on the transmit power/padding difference.

6. The method of claim 4, wherein the boosting comprises boosting a low power sector's reverse link rise-over-thermal threshold.

7. The method of claim 1, further comprising receiving a boost command associated with the overhead power.

8. The method of claim 1, wherein the boosting occurs upon a predetermined criterion.

9. The method of claim 8, wherein the predetermined criterion comprises a power-controlling cell being different from a forward link serving cell.

10. The method of claim 8, wherein the predetermined criterion comprises a DRCLock not being set for the AT's best FL.

11. The method of claim 1, wherein the boosting occurs upon determining the active set comprises multiple cells.

12. The method of claim 1, further comprising increasing a minimum allowable set-point.

13. The method of claim 1, further comprising reducing a traffic channel gain by a predetermined amount.

14. An apparatus for wireless communications, comprising:
   means for determining an imbalance indicator from each sector in an active set;
   means for boosting overhead power based on the imbalance indicator from each of the sectors; and
   means for padding, at least partially, a base transceiver station corresponding to a reverse link of a lower power sector to thereby attenuate signals received at the base transceiver station.

15. The apparatus of claim 14, wherein the imbalance indicator comprises an overhead imbalance indicator.

16. The apparatus of claim 14, wherein the imbalance indicator comprises a transmit power/padding difference.

17. The apparatus of claim 16, wherein the transmit power/padding difference indicates an amount of imbalance and wherein the boosting is based on the transmit power/padding difference.

18. The apparatus of claim 17, wherein the boosting is only partially based on the transmit power/padding difference.

19. The apparatus of claim 17, wherein the boosting comprises boosting a low power sector's reverse link rise-over-thermal threshold.

20. The apparatus of claim 14, further comprising receiving a boost command associated with the overhead power.

21. The apparatus of claim 14, wherein the boosting occurs upon a predetermined criterion.

22. The apparatus of claim 21, wherein the predetermined criterion comprises a DRCLock not being set for the AT's best forward link.

23. The apparatus of claim 21, wherein the predetermined criterion comprises a power-controlling cell being different from a forward link serving cell.

24. The apparatus of claim 21, wherein the predetermined criterion comprises a DRCLock not being set for the AT's best forward link.

25. The apparatus of claim 14, wherein the boosting occurs upon determining the active set comprises multiple cells.

26. The apparatus of claim 14, further comprising means for increasing a minimum allowable set point.

27. The apparatus of claim 14, further comprising means for reducing a traffic channel gain by a predetermined amount.

28. An apparatus for wireless communications, comprising:
   a processing system configured to:
      determine an imbalance indicator from each sector in an active set;
      boost AT overhead power based on the imbalance indicator from each of the sectors; and
      pad, at least partially, a base transceiver station corresponding to a reverse link of a lower power sector to thereby attenuate signals received at the base transceiver station.

29. The apparatus of claim 28, wherein the imbalance indicator comprises an overhead imbalance indicator.

30. The apparatus of claim 28, wherein the imbalance indicator comprises a transmit power/padding difference.

31. The apparatus of claim 30, wherein the transmit power/padding difference indicates an amount of imbalance and wherein the boosting is based on the transmit power/padding difference.

32. The apparatus of claim 31, wherein the boosting is only partially based on the transmit power/padding difference.

33. The apparatus of claim 31, wherein the boosting comprises boosting a low power sector's reverse link rise-over-thermal threshold.

34. The apparatus of claim 28, wherein the processing system is further configured to receive a boost command associated with the overhead power.

35. The apparatus of claim 28, wherein the boosting occurs upon a predetermined criterion.

36. The apparatus of claim 35, wherein the predetermined criterion comprises a power-controlling cell being different from a forward link serving cell.

37. The apparatus of claim 28, wherein the boosting occurs upon determining the active set comprises multiple cells.

38. The apparatus of claim 28, wherein the processing system is further configured to increase a minimum allowable set-point.

39. The apparatus of claim 28, wherein the processing system is further configured to reduce a traffic channel gain by a predetermined amount.

40. A computer-program product for communication, comprising:
    a machine-readable medium comprising instructions executable to:
    determine an imbalance indicator from each sector in an active set;
    boost overhead power based on the imbalance indicator from each of the sectors; and
    pad, at least partially, a base transceiver station corresponding to a reverse link of a lower power sector to thereby attenuate signals received at the base transceiver station.

* * * * *